United States Patent [19]

Ackeret

[11] Patent Number: 5,363,960
[45] Date of Patent: Nov. 15, 1994

[54] CONTAINER FOR MAGNETIC TAPE CASSETTE

[75] Inventor: Peter Ackeret, Kusnacht, Switzerland

[73] Assignee: IDN Inventions and Development of Novelties AG, Landquart, Switzerland

[21] Appl. No.: 988,124

[22] PCT Filed: Jun. 3, 1992

[86] PCT No.: PCT/EP92/01226

§ 371 Date: Feb. 11, 1993

§ 102(e) Date: Feb. 11, 1993

[87] PCT Pub. No.: WO92/22899

PCT Pub. Date: Dec. 23, 1992

[30] Foreign Application Priority Data

Jun. 19, 1991 [DE] Germany .............. 4120280
Sep. 26, 1991 [DE] Germany .............. 4132135

[51] Int. Cl.5 .................................. B65D 85/672
[52] U.S. Cl. ................... 206/387; 220/345; 312/9.48; 312/9.57
[58] Field of Search .............. 206/1.5, 387, 444; 220/345, 346, 347; 312/9.1, 9.9, 9.11, 9.29, 9.41, 9.47, 9.48, 9.57, 9.63

[56] References Cited

U.S. PATENT DOCUMENTS

| 3,899,229 | 8/1975 | Ackeret | 312/319 |
| 4,030,601 | 6/1977 | Ackeret | 206/387 |
| 4,067,629 | 1/1978 | Amatsu et al. | 206/387 X |
| 4,087,145 | 5/1978 | Weavers | 206/387 X |
| 4,113,091 | 9/1978 | Ackeret | 206/387 |
| 4,184,594 | 1/1980 | Hehn | 106/387 |
| 4,291,801 | 9/1981 | Basili et al. | 206/387 |
| 4,322,000 | 3/1982 | Struble | 206/387 |
| 4,365,713 | 12/1982 | Ekuan | 206/387 |
| 4,406,369 | 9/1983 | Wallace et al. | 206/387 |
| 4,702,372 | 10/1987 | Ackeret | 206/387 |
| 4,738,361 | 4/1988 | Ackeret | 206/387 |
| 4,828,341 | 5/1989 | Ackeret | 312/12 |

FOREIGN PATENT DOCUMENTS

0383007 8/1990 European Pat. Off. .
3015749 10/1981 Germany .
1170729 11/1969 United Kingdom .
WO8706210 10/1987 WIPO .

*Primary Examiner*—Paul T. Sewell
*Assistant Examiner*—Jacob K. Ackun, Jr.
*Attorney, Agent, or Firm*—Jeffrey H. Ingerman

[57] ABSTRACT

A storage container for magnetic tape cassettes adapted to receive cassettes of different design, i.e. standard compact cassettes or digitally recorded cassettes. If a standard compact cassette is inserted tape reel locking members are activated but remain inactive upon insertion of a digitally recorded cassette.

10 Claims, 9 Drawing Sheets

CONTAINER FOR MAGNETIC TAPE CASSETTE

BACKGROUND OF THE INVENTION

The present invention relates to a container or a storage device for magnetic tape cassettes of the basic design set forth in U.S. Pat. No. 3,899,229 or modifications thereof as disclosed in U.S. Pat. Nos. 4,702,372 or 4,738,361 or 4,828,341 the disclosure of which is incorporated herein by reference.

These conventional devices comprise a housing and a transporter slidably guided in said housing and adapted to carry a cassette. The transporter slider is spring-biassed towards an open or removal position and may be locked or latched within the housing in a storing position. The latch may be manually released.

The known devices are designed to receive the well-known standard compact cassettes which exhibit freely accessible tape reels. When stored and subjected to vibrations, e.g. in a vehicle, there is a risk that the tape reels are inadvertently rotated and the cassette may become destroyed due to so-called "tape salad". Therefore, the known containers are provided with blocking members integrally formed with the slider so as to engage into the tape reels and to lock them.

Recently, a novel type of cassette has appeared under the designation "DCC" or digitally recorded cassette. Such cassettes permit improved reproduction quality over that of conventional compact cassettes with analog recording. Recorders developed for such DCC cassettes are able to reproduce from DCC cassettes but also from conventional cassettes. Consequently, the exterior appearance of the two cassette types is quite similar. There are, however, two significant differences: While the standard compact cassette exhibits protruding head face portions of trapezoid contour such protruding portions are not present with DCC cassettes. Further, DCC cassettes are equipped with shutters shielding the tape reels against intrusion of dust; the reels are locked within the cassette until the reels are exposed upon placing the cassette into the reproducing apparatus whereby the shutters are displaced.

It will be understood that the conventional cassette containers are not suited for storing of DCC cassettes because of their tape reel blocking members, necessitating design of a device specifically adapted to receive DCC cassettes. Since, however, the reproducing apparatus may use both types of cassettes and it is not predictable what cassette type will be the preferred one of a particular person, there is a need to provide a cassette container adapted to receive either type of cassette.

SUMMARY OF THE INVENTION

The present invention provides such a device thanks to the design described below having a first housing with a substantially parallelepipedic shape and an opening, and a second, cassette transporter part displaceable through the opening in the first part. The two parts completely surround a cassette carried by the second part when the second part is in a storage position, and permit cassette exchange when the second part is in a removal position, into which it is biased by an ejection spring. A releasable latch retains the second part in the storage position against the bias of the ejection spring inside the first part. One of the parts has blocking members for engaging the tape reels of cassettes whose tape reels are accessible from the exterior. The blocking members are deactivated when the cassette being stored has tape reels that are not accessible from the exterior.

BRIEF DESCRIPTION OF THE DRAWINGS

Some embodiments of the invention are illustrated in the accompanying drawings and will be explained in detail hereunder with reference thereto. It should be noted that the drawings are somewhat schematic in order to emphasize the features which are important for the invention. Details which are not essential for the present invention may be derived from the publications incorporated above.

DETAILED DESCRIPTION OF THE INVENTION

Figure 1:
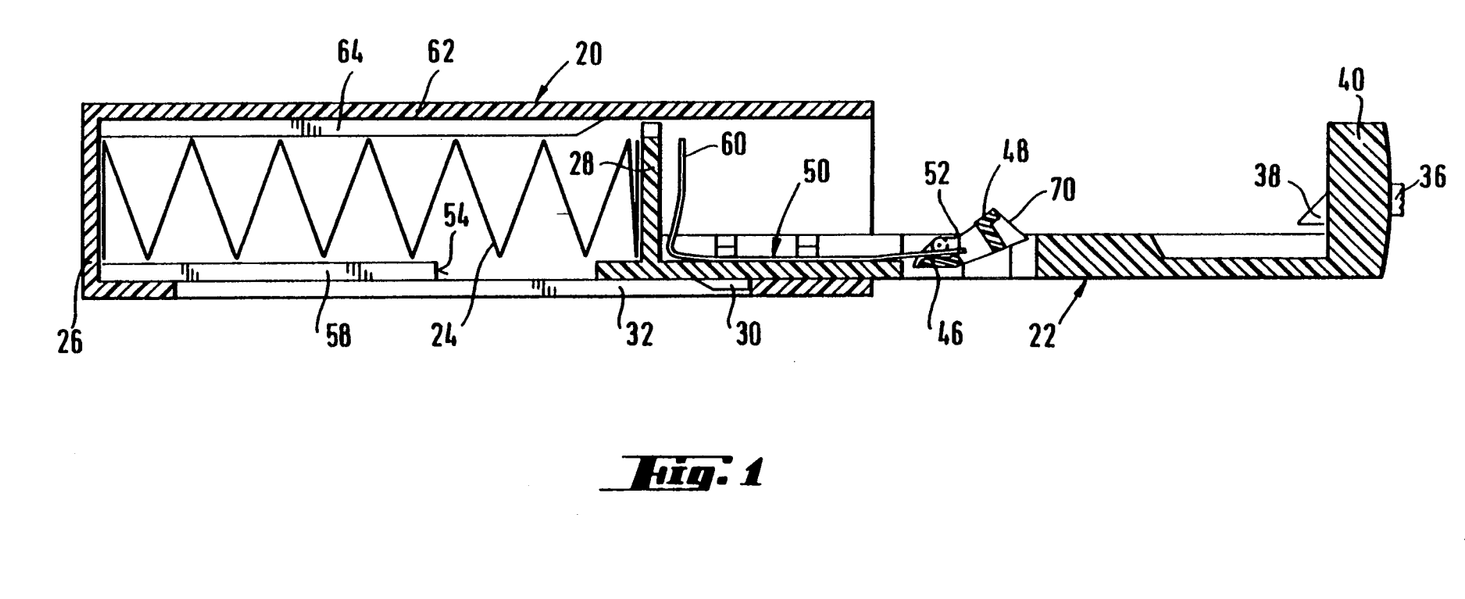
FIG. 1 is a section view of a device according to the invention seen as indicated by line 1—1 in FIG. 2.
Figure 2:
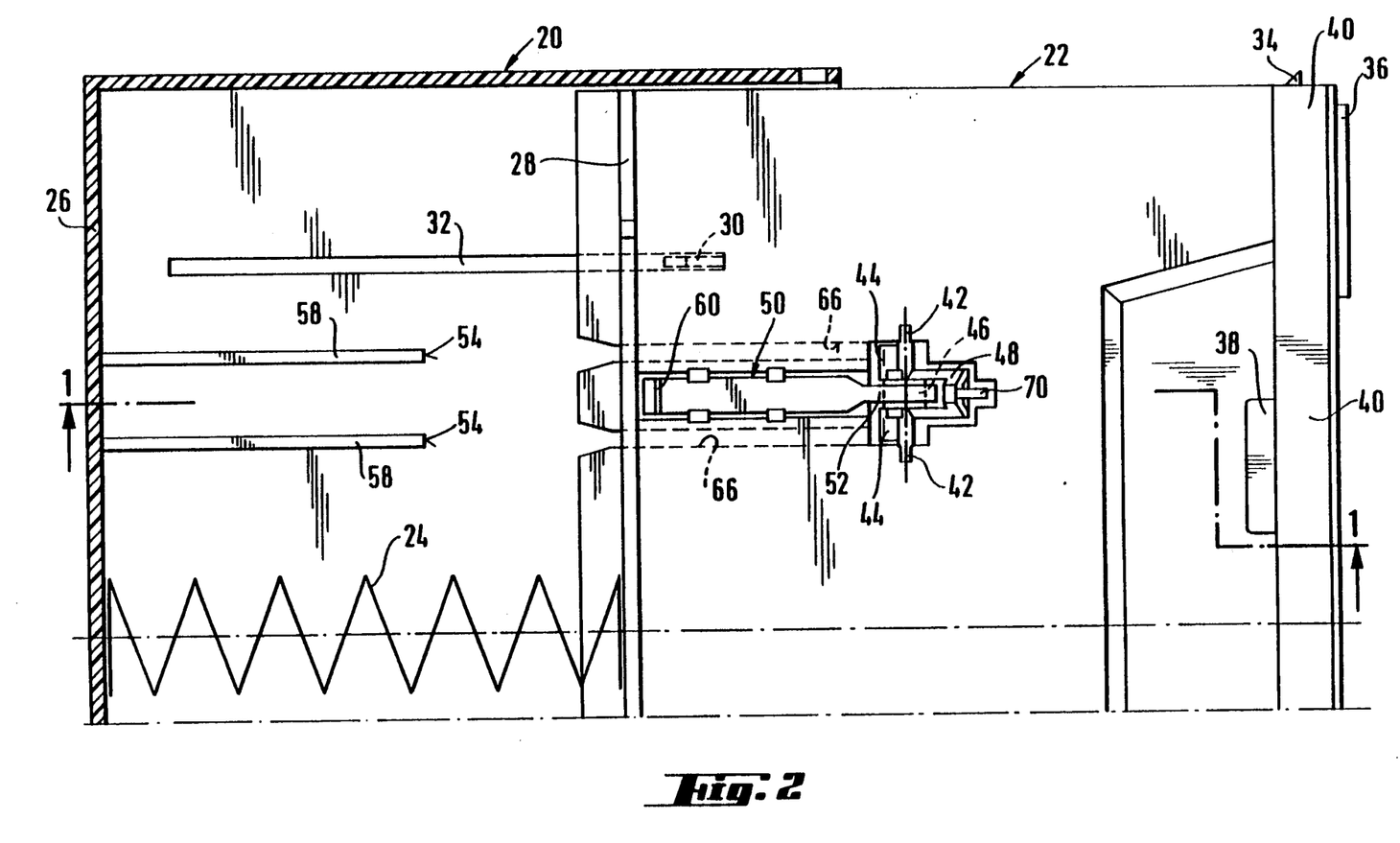
FIG. 2 is a partial plan view, with the housing in section, of the device of FIG. 1 with the transporter part in open position.
Figure 3:
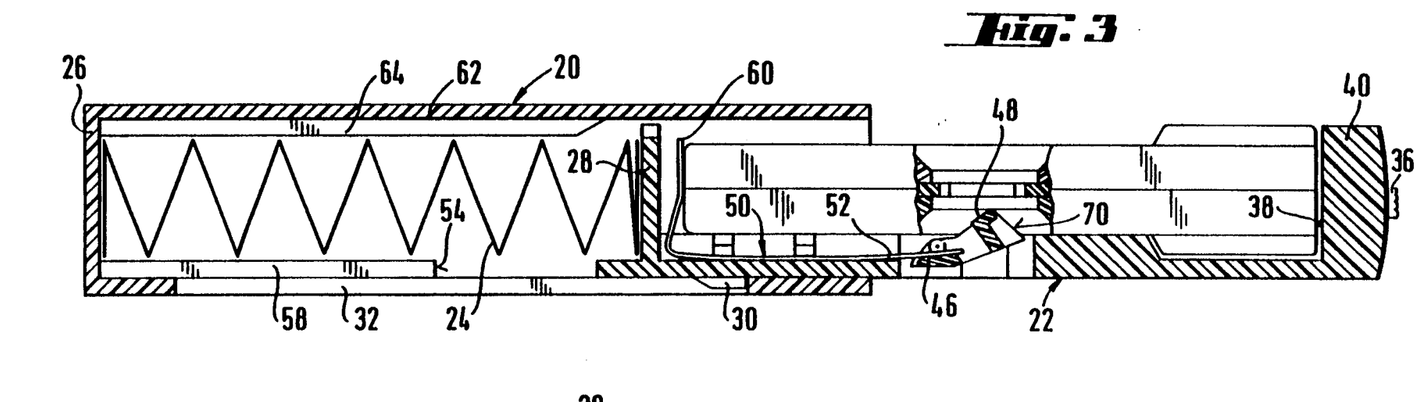
FIG. 3 is similar to FIG. 1 but with a compact cassette inserted.
Figure 4:
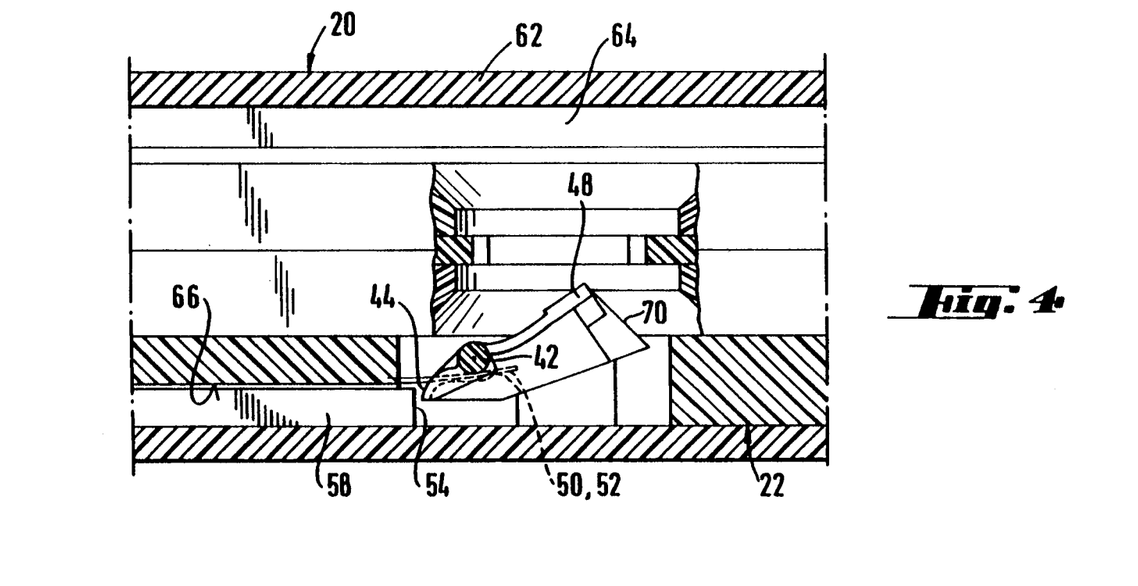
FIG. 4 shows the positions of blocking member and control element shortly before the storing position with a compact cassette inserted.
Figure 5:
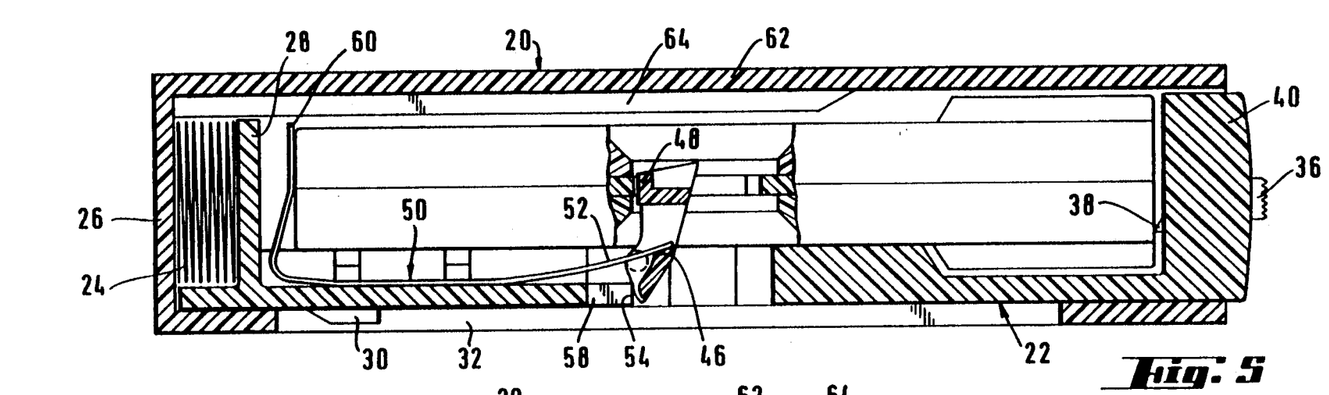
FIG. 5 is a similar illustration of the storing position.
Figure 6:
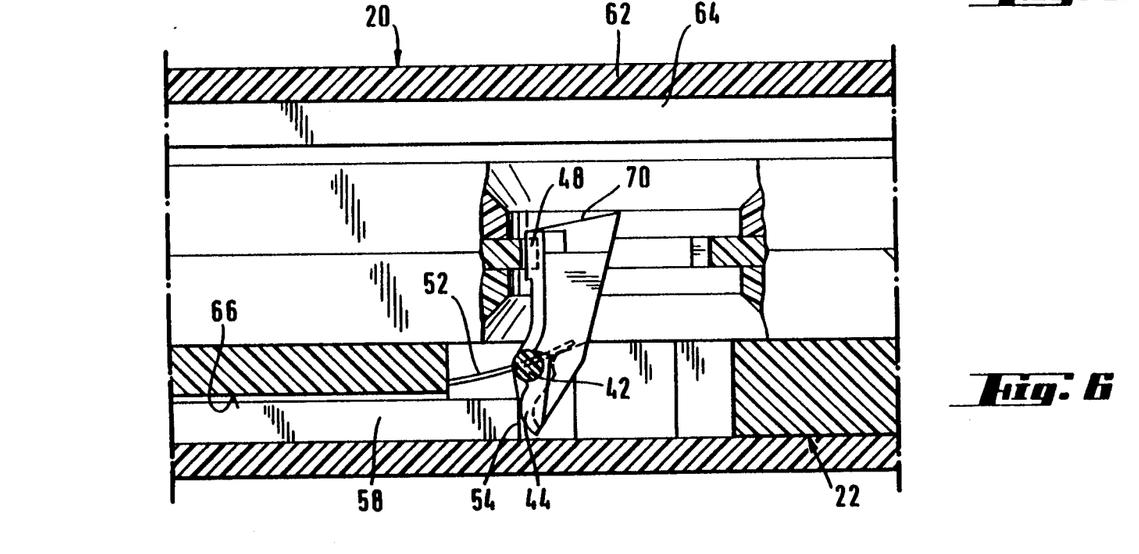
FIG. 6 illustrates the cooperation of the blocking member and control element in the storing position and with the compact cassette.
Figure 7:
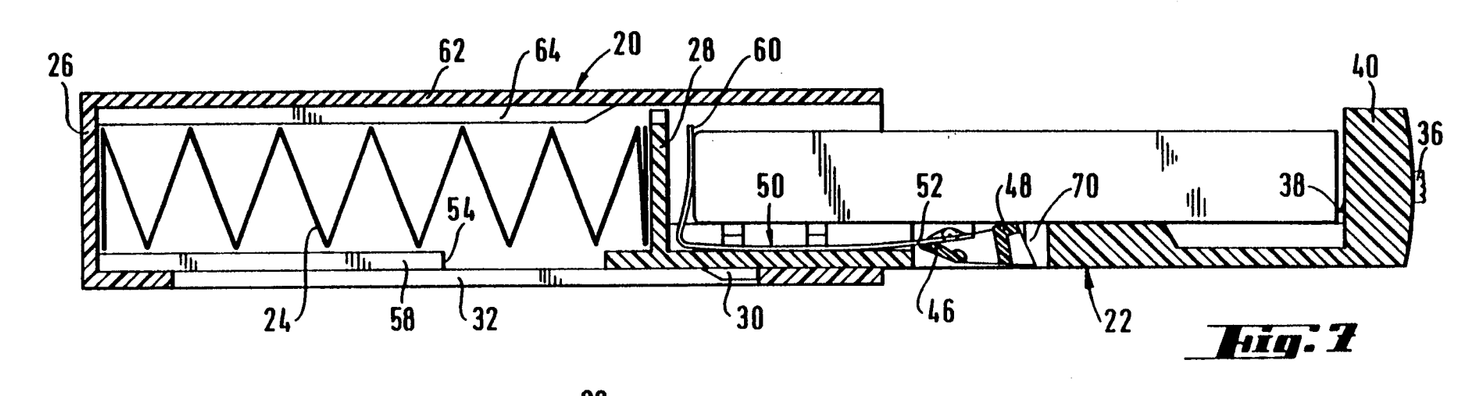
FIG. 7 is similar to FIG. 3 but with an inserted DCC cassette.
Figure 8:
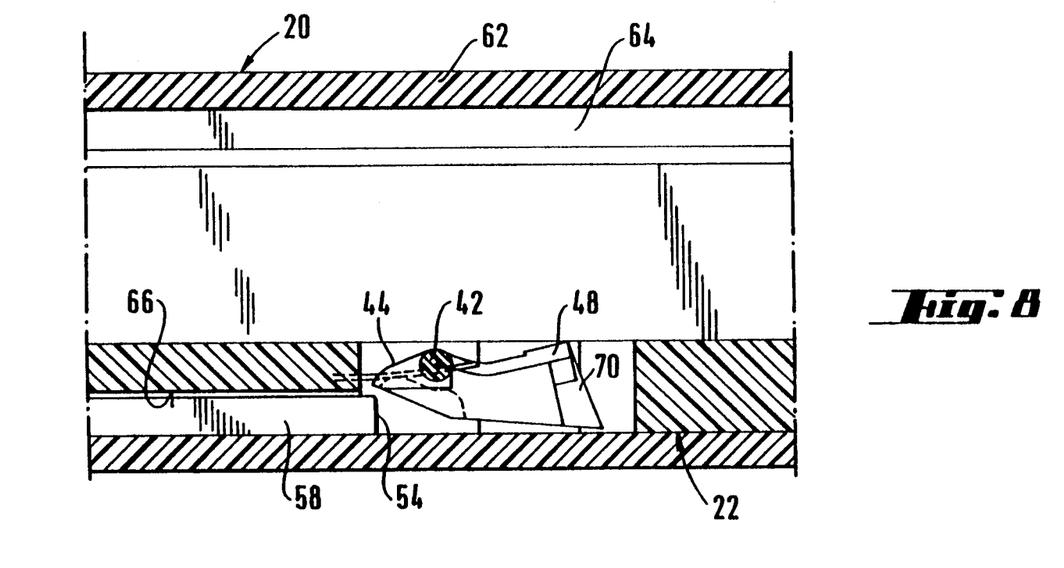
FIGS. 8 through 10 are similar to FIGS. 4 through 6 but with an inserted DCC cassette.
Figure 9:
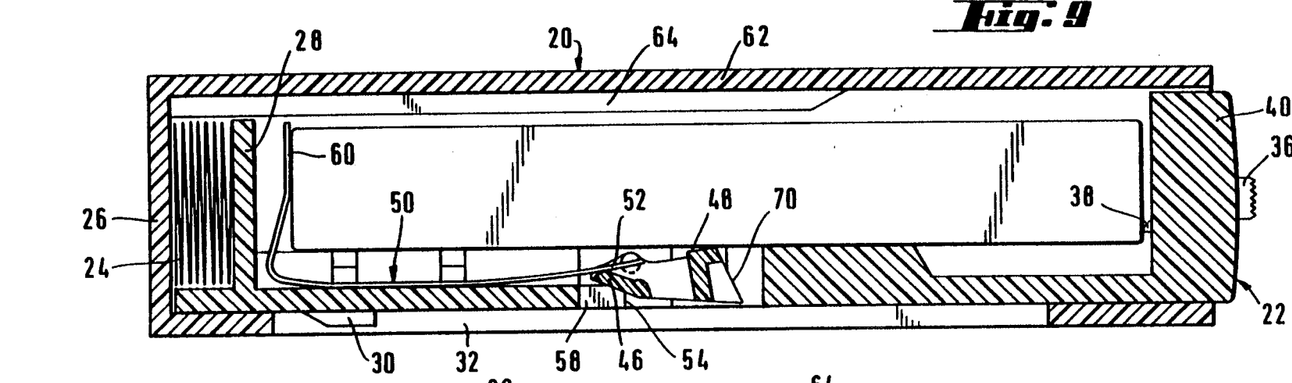
Figure 10:
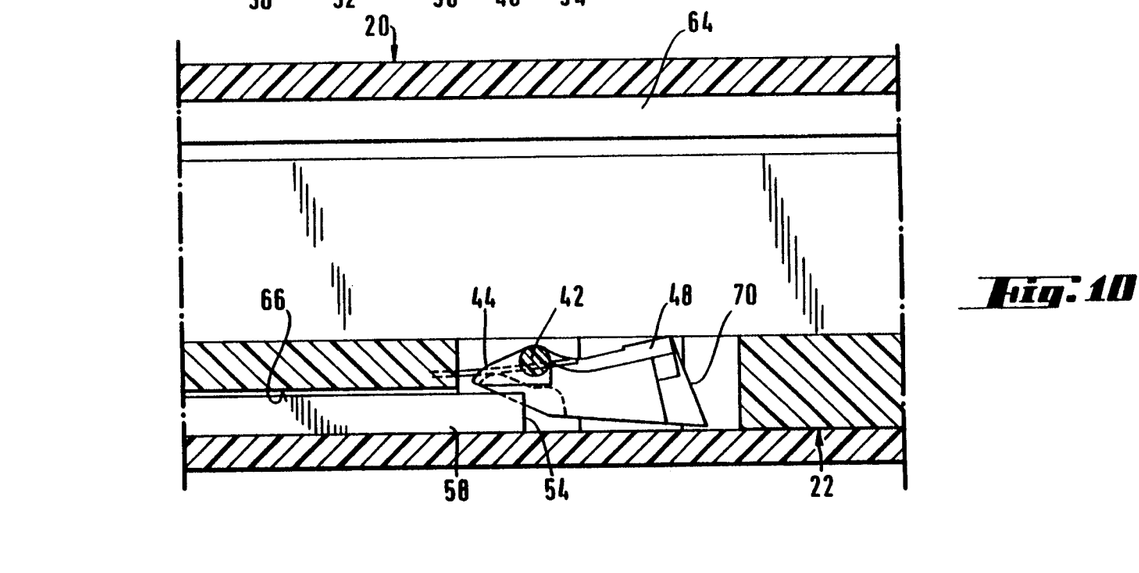
Figure 11:
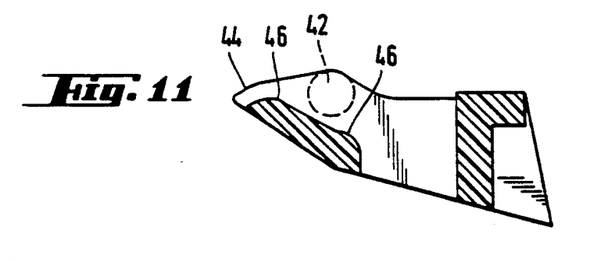
FIGS. 11 through 14 show in enlarged scale the blocking member respectively in section view, in side elevation, in plan view and in front view.
Figure 12:
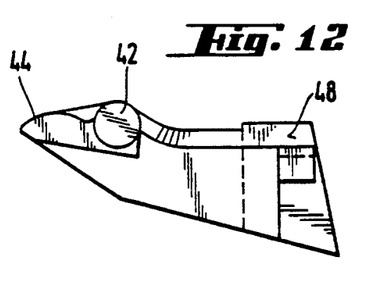
Figure 13:
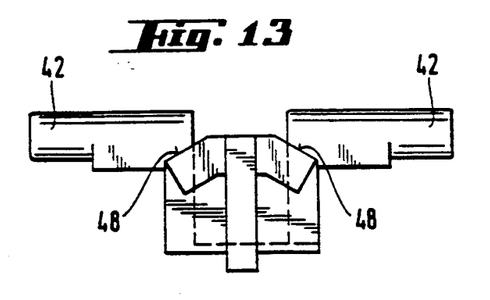
Figure 14:
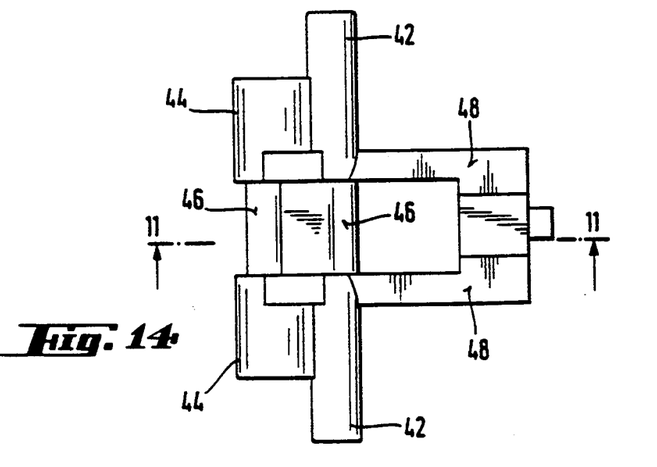

Referring now to the first embodiment, the container or storing device comprises a housing 20 injection molded from plastic material, a slider 22 also injection molded from plastic material and serving as a transporter part, and a helical compression spring 24 arranged between a housing rear wall 26 and a slider rear wall 28 so as to bias the slider towards the removal position as illustrated. The slider is longitudinally guided within the housing. Its outer end or removal position is defined by a stop 30 integrally formed with the slider and engaging into a bottom-side slot 32 of the housing. In its storing position as shown in FIG. 5, the slider is locked or latched by means of a latch element 34 which engages into a housing recess and may be unlatched by means of a key 36 for manual actuation. A transmitter member 38 for an occupation indicator is provided in the front wall 40 of the slider. The device described thus far exhibits features known in the prior art.

While the containers of the prior art have tape reel blocking members integrally molded with the slider in order to lock the tape reels when a cassette is received in the device, the container according to the first embodiment of the invention has blocking members pivotably journalled on the slider. When a cassette is placed on the slider the cassette type is sensed: If a compact cassette is to be stored, the blocking members are caused to assume an engaging position with respect to the tape reels at least when the slider is displaced into its storing position. If, on the contrary, a DCC cassette is placed on the slider the blocking members are caused to assume an inactive position.

In the embodiment of FIGS. 1 through 15 the blocking members themselves serve as sensors. Each blocking member comprises two bearing pins 42 to be snapped into respective recesses of the slider bottom, a control projection 44 (only one in the embodiment of FIG. 15 but two in symmetrical configuration in the embodiment of FIGS. 1 through 14), spring stops 46 and the very blocking surfaces 48 which, in the activated position, are urged against teeth of the tape reels.

In the embodiments of FIGS. 1 through 15 each blocking member is biased into a stand-by position by means of a leaf spring 50 mounted on the slider bottom, cf. FIG. 1. One of the two distal ends of the leaf spring, i.e. end 52, rests on the two stops 46. If a compact cassette is placed on the slider (FIG. 3) the blocking member extends in part into the cassette apertures via which the tape reel openings are accessible, the blocking member thereby not being deflected. When the slider pushed home into the housing, control projection 44 hits an end edge 54 of a control rib 58 integrally molded with the housing bottom; in the embodiment of FIGS. 1 through 14 there is a pair of such ribs in symmetrical configuration. Engagement between projection 44 and end edge 54 causes the blocking member to pivot about its bearing pins until the blocking surfaces engage the interior of the tape reels. If, on the contrary, a DCC cassette is placed on the slider the blocking members are pivoted in the opposite direction since the DCC cassette does not have an aperture into which the blocking member could extend. Control projection 44 thus assumes a position above end edge 54 of the control rib and cannot be activated.

The other distal or free end 60 of the leaf spring is angled upwards and bent towards the slider front wall thereby assuring that the occupation indicator is always properly actuated. Moreover, this spring end permits the cassette to yield when the slider is slightly pushed inwards beyond its storing position in order to open the container, such inwards movement of the slider causing the blocking member to be pivoted beyond its blocking position thereby pushing the cassette along the slider bottom.

The housing opening is dimensioned such that a compact cassette can be inserted only with its thinner end first but not with the end where the head face projections are. This restriction is necessary because the centers of the tape reels are asymmetrically disposed. Downholder ribs 64 are integrally molded with the housing top wall 62 so as to hold an inserted DCC cassette flat and urged against the slider bottom. These ribs 64 are located such that when a compact cassette is inserted they do not interfere with the head face projections thereof. The bottom side of the slider bottom has grooves 66 to accommodate the control ribs 58. Ramp 70 of the blocking members serve to guide a cassette upon the latter being inserted.

Figure 15:
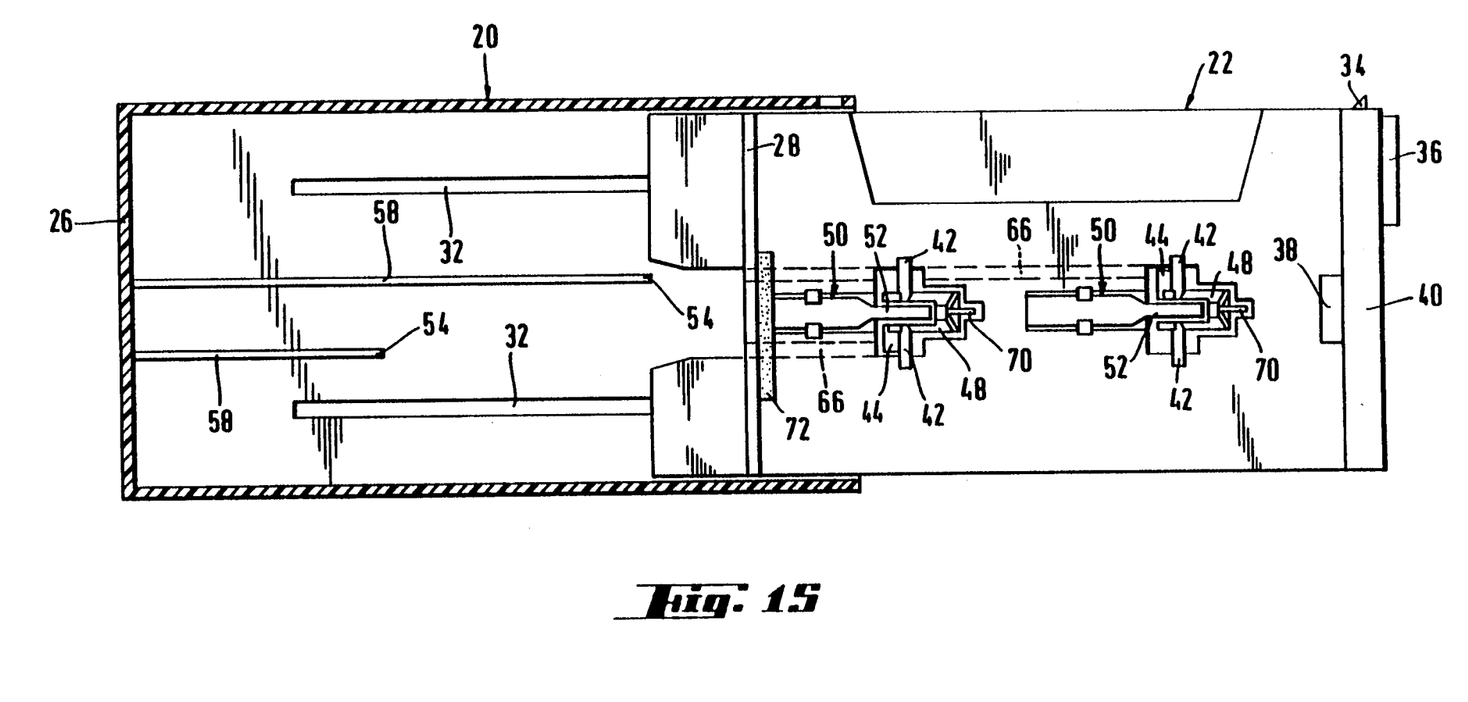
FIG. 15 is a plan view of a modified device with the housing in section, the transporter part in the open position, and without an inserted cassette.

The embodiment of FIG. 15 differs from the first embodiment in that the cassettes are inserted longitudinally. For this reason, each blocking member has one control projection only, and the control ribs have different lengths.

Instead of the free spring end 60 there is a cushion 72 made of resilient material, preferably foamed plastic material. It is to be noted that there are further options to introduce the necessary backlash: The blocking member itself or its bearing pins may be resilient, the end edge of the control rib may be resilient, the slider may elastically yield adjacent the recesses engaged by the bearing pins: Somewhere in the considered cinematic chain some elasticity is provided.

Figure 16:
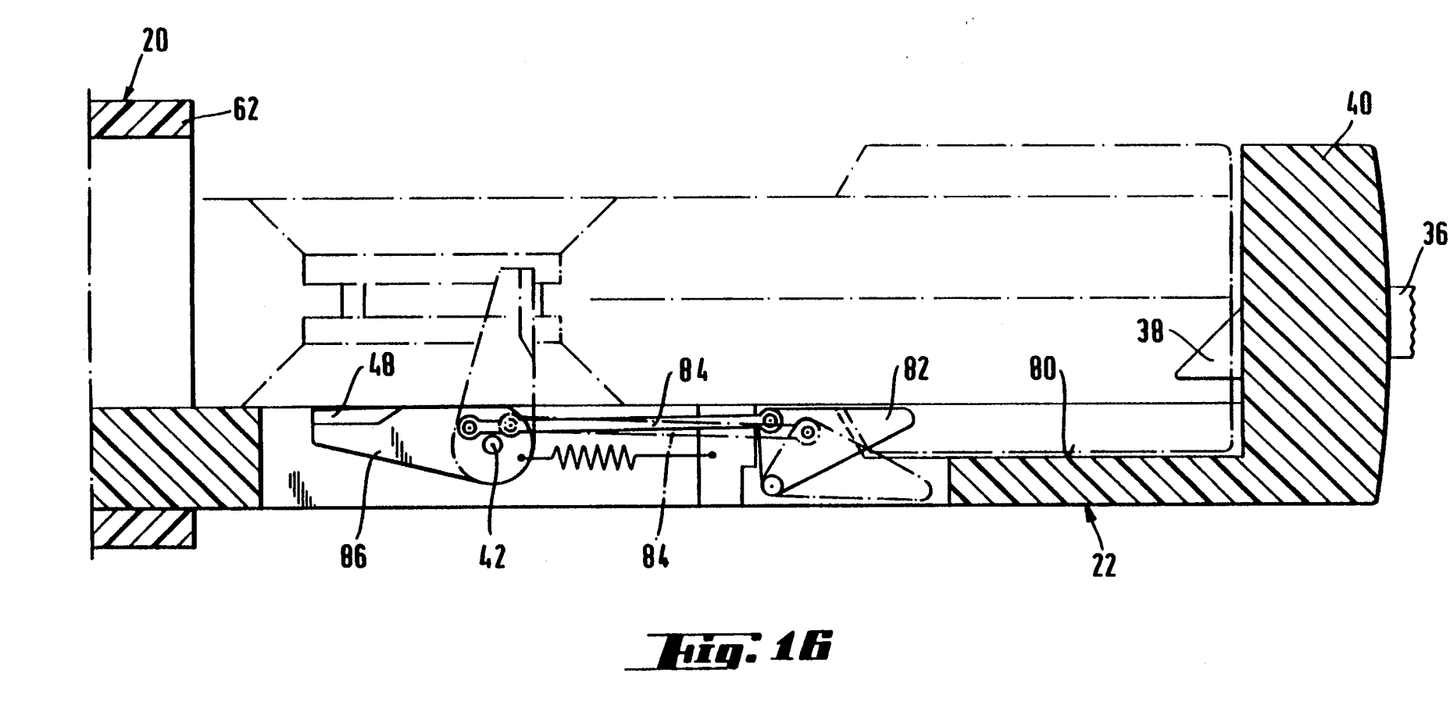
FIG. 16 is a partial section view of a device in accordance with the present invention and having a modified control system for the blocking members.

While in the embodiments of FIGS. 1 through 15 presence or absence of tape reel access apertures is sensed, in the embodiment of FIG. 16 presence of the protruding head face projections of compact cassettes or their absence with DCC cassettes, is sensed.

The slider bottom has a recess 80 shaped and dimensioned to accommodate the head face projection on the bottom side of a compact cassette. A sensor lever 82 extends into the recess and is deflected against spring bias (not shown) by such a projection. The deflection is transmitted via a link 84 to the pivotable blocking member 86. The relative lengths of the individual lever arms is selected such that the angle through which the blocking member is pivoted is sufficient to lock the respective tape reel. The entire sensing and locking system is provided in the slider so that the tape reels are locked immediately when the compact cassette is placed on the slider, and there is no need to provide control ribs or the like on the housing.

It will be understood that numerous modifications may be provided in the embodiments shown and described. For instance, displaceable control members may be provided on the housing and the control rib may be displaceably mounted on the slider so as to assume, in response to the type of the inserted cassette, an activating or non-activating position. In such a design preferably the presence or absence of the head face projections is sensed. In the embodiments of FIGS. 1 through 15, the sensor portion of the blocking members assumes a stand-by position or intermediate or "semi-active" position when there is no cassette on the slider, and may be deflected in either direction. In contrast, the blocking member of the FIG. 16 embodiment assumes one of its two end positions, the inactive one, when the slider is empty. Designs are conceivable in which the blocking members are in their active or blocking end position when the slider is empty, and the blocking members can be deflected upon insertion of a DCC cassette.

What is claimed is:

1. A device having at least one cassette receiving compartment for storing two types of magnetic tape cassettes, a first type of magnetic tape cassette having accessible tape reels and a second type of magnetic tape cassette having inaccessible tape reels, said compartment being capable of receiving for storage only one of said cassettes at any one time, said device comprising:

a substantially parallelepipedic housing part having an opening;

a cassette transporter part reciprocable relative to said housing part through said housing part opening, said parts defining said at least one cassette receiving compartment;

a displaceable sensor mounted on one of said parts for sensing which of said first and second cassette types said one of said cassettes is;

an elastic member for biasing said sensor into a sensing position;

blocking members responsive to said sensor for assuming a first position when said sensor senses that one of said first type of magnetic tape cassette is received for storage in said compartment, and assuming a second position when said sensor senses that one of said second type of magnetic tape cassette is received for storage in said compartment; whereby:

when one of said first type of magnetic cassette is received for storage in said compartment, said blocking members in said first position engage into said accessible tape reels, and when one of said second type of magnetic tape cassette is received for storage in said compartment, said blocking members remain in said second position out of engagement with said one of said second type of magnetic tape cassette.

2. The device of claim 1 wherein:

said cassette transporter part is slidably reciprocable;

said device further comprising:

an ejection spring biasing said transporter part into an ejected position relative to said housing part; and a manually releasable locking means retaining said transporter part in a storage position within said housing part against bias of said ejection spring.

3. The device of claim 2 wherein said sensor is provided on at least one of said blocking members.

4. The device of claim 3 wherein said blocking members are pivotably mounted on said transporter part whereby:

said blocking members are rotated into engagement with said accessible tape reels when said sensor senses that one of said first type of magnetic tape cassette is received for storage in said compartment.

5. The device of claim 4 wherein said housing part has elements for rotating said blocking members when said transporter part is moved from its ejected position toward its storage position within said housing part.

6. The device of claim 1 wherein, when said first type of magnetic tape cassette has protruding head face portions, and said second type of magnetic tape cassette lacks protruding head face portions:

said compartment has a portion for receiving said head face portions; and said sensor is biased to extend into said portion of said compartment.

7. The device of claim 6 wherein said sensor is mechanically coupled to at least one of said blocking members.

8. The device of claim 1, wherein, when there is backlash between said transporter part and a cassette placed thereon, said device further comprises means for compensating for said backlash, said means for compensating being resilient.

9. The device of claim 1 wherein said blocking members are responsive to said sensor when a cassette of said first type of magnetic tape cassette is placed on said transporter part.

10. The device of claim 1 wherein, when a cassette of said first type of magnetic tape cassette is placed upon said transporter part, said blocking members are responsive to said sensor upon displacement of said transporter part from an ejected position relative to said housing part toward a storage position within said housing part.

* * * * *